Patented Nov. 24, 1936

2,061,889

UNITED STATES PATENT OFFICE 2,061,889

PROCESS FOR SEPARATION AND PURIFICATION OF METHYL AMINES

Chester E. Andrews, Brookline, and Le Roy U. Spence, Philadelphia, Pa., assignors to Röhm & Haas Company, Philadelphia, Pa.

No Drawing. Application May 18, 1931, Serial No. 538,262

14 Claims. (Cl. 202—42)

The object of the present invention is to provide a method of separation of monomethylamine and dimethylamine from mixtures which also contain trimethylamine, and which may or may not contain ammonia.

In the preparation of the methylamines the reaction product from the various processes nearly always contains all three of the methylamines, either in the free state or combined in the form of salts, and quite often, ammonia either in the free state or as a salt. In processes in which the amines are prepared by the action of methylating agents (such as methyl alcohol, dimethyl sulfate, methyl chloride or other methyl esters) on ammonia, the methylation always yields all three of the methylamines since monomethylamine and dimethylamine are also reacted upon after their formation by methylating agents. All three of the amines are formed by the methylation of ammonium salts by the above methylating agents. When formaldehyde and ammonium salts react together all three methylamines are also formed.

The separation by fractional distillation of such mixtures of amines is a very difficult process. The literature states that these amines cannot be separated by fractional distillation. (Bernthsen-Sudborough "Textbook of Organic Chemistry" page 109, D. van Nostrand Co., N. Y. 1922.)

We have discovered that a separation can be obtained by fractional distillation if the trimethylamine is first removed in a constant boiling mixture with ammonia.

We have found that one of the difficulties encountered in the fractional distillation, a fact which others have not recognized, is that monomethylamine and trimethylamine form a constant boiling mixture which boils at a slightly lower temperature than monomethylamine and contains about 30% by weight of trimethylamine. (According to the literature (International Critical Tables, vol. I) the boiling point of pure monomethylamine at atmospheric pressure is —6.5° C.; pure trimethylamine, +3.5° C.; and pure dimethylamine, +7.4° C.) Thus, in the distillation of a mixture of the three amines the first fraction will consist of this binary mixture of monomethylamine and trimethylamine. If there is enough methylamine in the mixture so that all the trimethylamine is removed as the constant boiling mixture the next fraction will be the remaining monomethylamine and the last will be dimethylamine. If the trimethylamine present in the mixture is more than 30% of the combined weight of monomethylamine and trimethylamine, no pure monomethylamine will be obtained. Distillation of such a mixture would result in the separation of a constant boiling mixture of monomethylamine and trimethylamine containing all of the monomethylamine and leaving a mixture of trimethylamine and dimethylamine. The boiling points of the last two substances are so nearly the same that the separation is difficult.

In view of our discovery of the fact that mono- and trimethylamine form a constant boiling mixture which comes off as the first fraction and contains about 30% by weight of trimethylamine, the process of separation becomes easier to work. For instance, if the trimethylamine is in excess over the amount required to form a constant boiling mixture with the monomethylamine, monomethylamine is added so that the mono- and trimethylamine can be distilled off together as a constant boiling mixture. If monomethylamine is in excess, the mixture is distilled until the trimethylamine is removed; the remaining monomethylamine and dimethylamine can then be readily separated by fractional distillation, since their boiling points differ by about 14° C.

The separation of mono- and trimethylamines as a constant boiling mixture is not claimed herein but is claimed in our companion application Serial No. 75,122, filed April 18, 1936.

We have also found that the addition of ammonia to the mixture of the amines makes possible their complete separation. This is due to the fact that ammonia forms with trimethylamine a constant boiling mixture which boils at a slightly lower temperature than ammonia. With the trimethylamine out of the mixture it is easy to get fractions of mono- and dimethylamine since the difference in their boiling points is about 14° C. The constant boiling mixture of ammonia and trimethylamine contains about 27% by weight of trimethylamine when distilled at atmospheric pressure. Thus by adding a suitable amount of ammonia (at least 7 parts of ammonia by weight to 3 parts of trimethylamine or preferably 73 parts of ammonia to 27 parts of trimethylamine) to a mixture of the three amines and then fractionating, the trimethylamine may be separated from the other two amines and monomethylamine may then readily be separated from dimethylamine. In such a fractionation there will be obtained a constant boiling mixture of ammonia with trimethylamine, then a fraction containing the monomethylamine, and the last fraction containing the dimethylamine. The amount of ammonia required to remove the trimethylamine in one distillation will depend upon the efficiency of the fractionating column, but will never be less than required to form the constant boiling mixture with the trimethylamine. Of course there will be other intermediate fractions during the course of the distillation as known by anyone versed in the art and as indicated in the examples.

If a mixture containing a large excess of ammonia is fractionated, the first fraction will contain ammonia and trimethylamine, the next fraction only ammonia, then a monomethylamine fraction and finally a dimethylamine fraction. Such mixtures may be obtained from catalytic processes where an excess of ammonia over the methylating agent is used in order to produce as much monomethylamine as possible.

In the fractionation of these substances, the change in the boiling point of the distillate gives an indication of the change of the composition of the distillate from one fraction to the next, except when a constant boiling mixture is involved. Thus in the case of the constant boiling mixture of ammonia and trimethylamine as one fraction, and ammonia as the next fraction the change in boiling point is very small and some other indication is better to show the change from one fraction to the next. Qualitative chemical tests may be made for the presence of trimethylamine in the distillate or physical properties such as the gas density of the distillate may be used as the indication of the change in composition of the distillates.

This process is also applicable to mixtures of the salts of the methylamines since the free amines may be readily obtained from the salts by treatment with alkali. The presence of other substances such as water, methanol, sodium formate, inorganic salts and other substances less volatile than the methylamines does not affect the separation of the methylamines.

The distillation may be carried out in any suitable fractionating column such as a packed column or bubble plate column under atmospheric or higher pressures. Of course, the taller the column the more efficient will be the separation. It is preferred to carry out the distillation under sufficient pressure so that ammonia and the amines may be condensed with water at atmospheric temperature. In addition to the advantage of using water as the condenser cooling medium when distilling under pressure, there is the added advantage that the difference between the boiling points of the components of the mixture increases under pressure and makes the separation easier.

For example, the difference between the boiling points of monomethylamine and dimethylamine at atmospheric pressure is about 14 degrees centigrade, while the difference in their boiling points at an absolute pressure of 100 lbs. per sq. in. is about 19° C.

The following examples illustrate preferred embodiments of the invention but it should be understood that they do not in any way limit the scope of the claims since it is apparent to anyone versed in the art that deviation can be made to a great extent without departing from the spirit of the invention.

The process is not limited in application to the particular mixture given in the examples; but may be applied to any mixture as long as the ammonia added to, or present in, the mixture is at least enough to form the constant boiling mixture with the trimethylamine present. Any suitable pressure may be used. The temperatures given in the examples only apply when the stated pressures are employed. When operating at the pressures given in an example the temperature interval given in the example may be varied according to the purity desired in the product. Although the ratio of ammonia and trimethylamine in the constant boiling mixture stands at 7 to 3 or preferably 73 to 27, it is usually desirable to add excess ammonia to make up for the inefficiency of the column employed and to insure greater purity in the products obtained.

The process may be operated as a continuous distillation instead of a batch distillation as given in the example. In the case of continuous process the ammonia-trimethylamine is taken from the top of the column, and the monomethylamine is taken off part way down the column and the dimethylamine near the bottom of the fractionating column. In the continuous process the ammonia in the feed into the column must be enough to form the constant boiling mixture with the trimethylamine in the feed. The purity of the monoethylamine and the dimethylamine then obtained will depend upon the design of the fractionating column used.

Example #1

The following example is given to illustrate the operation of the method for the separation of the amines. To a mixture of 500 lbs. monoethylamine, 200 lbs. dimethylamine, 50 lbs. trimethylamine, 40 lbs. of water and 20 lbs. of methanol, add 250 lbs. of ammonia (5 times the trimethylamine) and distill the mixture under 200 lbs. gage pressure in an efficient fractionating column. As the first fraction collect the material boiling at 38° to 40° C. This fraction contains all the trimethylamine and most of the ammonia (about 50 lbs. $(CH_3)_3N$ and 225 lbs. $NH_3$). An intermediate fraction is collected while the temperature rises from 40 to 72° centigrade. This fraction contains about 25 lbs. of ammonia and 25 lbs. of monomethylamine. After this fraction is removed, the pressure may be lowered to 100 lbs. gage and then the distillation is continued collecting the monomethylamine fraction boiling at 49° to 52° centigrade, which is about 96–100% pure and will weigh about 475 lbs. The next fraction, collected while the boiling point changes from 52° to 68° C. contains about 50 lbs. of monomethylamine and 50 lbs. dimethylamine. The last fraction is collected at 68–73° C. and will contain about 150 lbs. of 95% pure dimethylamine. The residue in the still is the methanol and water charged in together with a small amount of dissolved dimethylamine. The fraction containing the mixture of ammonia and monomethylamine is charged back into the still with the next batch. The same is done with the fraction containing mixed mono- and dimethylamine.

Example #2

To a mixture of 50 lbs. of ammonia, 500 lbs. of monomethylamine, 200 lbs. dimethylamine and 50 lbs. of trimethylamine, add 200 lbs. of ammonia so that the total ammonia in the mixture will be five times the weight of trimethylamine. Distill the mixture in an efficient fractionating column operating under the same pressures and collecting the fractions at the same temperatures as given in Example #1. The results of the fractionation will be the same as those obtained in Example #1.

Example #3

To a mixture of 500 lbs. of monomethylamine and 50 lbs. of trimethylamine add 250 pounds of ammonia and distill in an efficient fractionating column of suitable size. Distill the mixture under 200 lbs. per sq. in. gage pressure and collect as the first fraction the material boiling at 38–40° centigrade. This fraction contains all the trimethylamine and most of the ammonia (about 50 lbs. trimethylamine and 225 lbs. of ammonia). An intermediate fraction is now collected while the temperature rises from 40 to 72° centigrade. This fraction contains about 25 lbs. of ammonia and 25 lbs. of monomethylamine. The material remaining in the still is pure monomethylamine. The intermediate fraction containing ammonia and monomethylamine is charged back into the still when the next batch is distilled. Separation of mixtures of the composition given in this example may be carried out in a continuous still as will be evident to one skilled in the art of distillation. Ammonia must be injected into the feed so that the feed contains 5 parts of ammonia to one of trimethylamine.

Example #4

To a mixture of 200 lbs. of dimethylamine and 50 lbs. of trimethylamine add 250 pounds of ammonia (five times the trimethylamine present) and distill in an efficient fractionating column of suitable size. Distill the mixture under 200 lbs./sq. in. gage pressure and collect as the first fraction, the material boiling at 38–42° centigrade. This fraction contains all the trimethylamine and most of the ammonia (about 50 lbs. trimethylamine and 225 lbs. of ammonia). An intermediate fraction is now collected while the temperature rises from 42° to 95° centigrade. This fraction contains about 25 lbs. of ammonia and 25 lbs. of dimethylamine. The material remaining in the still is pure dimethylamine. The intermediate fraction containing ammonia is charged back into the still with the next batch. Separation of mixtures of this composition may also be carried out in a continuous still; in this case ammonia is added to the feed to the still so that the feed contains 5 parts of ammonia to one part of trimethylamine by weight.

What we claim is:

1. In the separation of monomethylamine and dimethylamine from trimethylamine the steps comprising the addition of sufficient ammonia to remove the trimethylamine as a constant boiling mixture and distilling.

2. In the separation of dimethylamine and trimethylamine the steps comprising the addition of sufficient ammonia to remove the trimethylamine as a constant boiling mixture and distilling.

3. The process of separating amines from mixtures of salts of amines which comprises treating the salts with alkali, adding sufficient ammonia to the amines thus evolved to form a constant boiling mixture with the trimethylamine, removing the trimethylamine by distillation as a constant boiling mixture with ammonia, then continuing distillation until monomethylamine and dimethylamine are separated.

4. The process of separating methylamines from mixtures containing them and ammonia which comprises the steps of adding ammonia to the mixture and distilling to remove the trimethylamine as an azeotropic mixture with ammonia and continuing the distillation until the monomethylamine and dimethylamine are separated.

5. The process of separating methylamines from mixtures containing them and ammonia, which comprises the steps of adding sufficient ammonia to the mixture to insure the formation of a constant boiling mixture with all of the trimethylamine, distilling to separate the constant boiling mixture, and continuing the distillation until the monomethylamine and dimethylamine are separated.

6. The process of separating trimethylamine from mixtures of monomethylamine, dimethylamine, trimethylamine and ammonia, which comprises the steps of adding ammonia to the mixture and distilling to separate the trimethylamine as an azeotropic mixture with ammonia.

7. The process of separating trimethylamine from mixtures of monomethylamine, dimethylamine and trimethylamine, which comprises the steps of adding ammonia to the mixture and distilling to separate the trimethylamine as an azeotropic mixture with ammonia.

8. The process of separating trimethylamine from mixtures of dimethylamine and trimethylamine which comprises the steps of adding ammonia to the mixture and distilling to separate the trimethylamine as an azeotropic mixture with ammonia.

9. The process of separating trimethylamine from mixtures of monomethylamine and trimethylamine, which comprises the steps of adding ammonia to the mixture and distilling to separate the trimethylamine as an azeotropic mixture with ammonia.

10. The process of separating monomethylamine and trimethylamine which comprises the steps of adding sufficient ammonia to the mixture to insure the formation of a constant boiling mixture with all the trimethylamine, and distilling to separate the constant boiling mixture.

11. The process of separating trimethylamine from mixtures of monomethylamine, dimethylamine, trimethylamine and ammonia, which comprises the steps of adding ammonia to the mixture and fractionating to separate the trimethylamine as an azeotropic mixture with ammonia.

12. The process of separating trimethylamine from mixtures of monomethylamine, dimethylamine and trimethylamine, which comprises the steps of adding ammonia to the mixture and fractionating to separate the trimethylamine as an azeotropic mixture with ammonia.

13. The process of separating trimethylamine from mixtures of dimethylamine and trimethylamine which comprises the steps of adding ammonia to the mixture and fractionating to separate the trimethylamine as an azeotropic mixture with ammonia.

14. The process of separating trimethylamine from mixtures of monomethylamine and trimethylamine, which comprises the steps of adding ammonia to the mixture and fractionating to separate the trimethylamine as an azeotropic mixture with ammonia.

CHESTER E. ANDREWS.
LE ROY U. SPENCE.

CERTIFICATE OF CORRECTION.

Patent No. 2,061,889. November 24, 1936.

CHESTER E. ANDREWS, ET AL.

It is hereby certified that error appears in the printed specification of the above numbered patent requiring correction as follows: Page 2, second column, line 23, for "monoethylamine" read monomethylamine; and line 30, for the syllable "monoethyl-" read monomethyl; and that the said Letters Patent should be read with these corrections therein that the same may conform to the record of the case in the Patent Office.

Signed and sealed this 29th day of June, A. D. 1937.

Henry Van Arsdale (Seal) Acting Commissioner of Patents.